United States Patent
Kita et al.

(10) Patent No.: US 10,533,626 B2
(45) Date of Patent: Jan. 14, 2020

(54) SPRING DAMPER AND ACCELERATOR DEVICE USING THE SPRING DAMPER

(71) Applicant: DENSO CORPORATION, Kariya, Aichi-pref. (JP)

(72) Inventors: Takuto Kita, Kariya (JP); Yoshinori Inuzuka, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/567,728

(22) PCT Filed: Apr. 26, 2016

(86) PCT No.: PCT/JP2016/002180
§ 371 (c)(1),
(2) Date: Oct. 19, 2017

(87) PCT Pub. No.: WO2016/194293
PCT Pub. Date: Dec. 8, 2016

(65) Prior Publication Data
US 2018/0135726 A1 May 17, 2018

(30) Foreign Application Priority Data
Jun. 5, 2015 (JP) .................................. 2015-114776

(51) Int. Cl.
*G05G 5/05* (2006.01)
*F16F 15/08* (2006.01)
(Continued)

(52) U.S. Cl.
CPC ............ *F16F 15/085* (2013.01); *B60K 26/02* (2013.01); *F16F 3/12* (2013.01); *G05G 1/38* (2013.01);
(Continued)

(58) Field of Classification Search
CPC ........... F16F 3/12; G05G 1/327; G05G 1/323; G05G 1/32; G05G 1/30; G05G 1/44;
(Continued)

(56) References Cited

U.S. PATENT DOCUMENTS 1,936,389 A * 11/1933 Hallquist .................. F16F 3/12
105/198.7
2,828,934 A * 4/1958 Markowski ............. F16F 1/362
267/135

(Continued)

FOREIGN PATENT DOCUMENTS

FR 1476682 A * 4/1967 ............. B61G 11/10
GB 2052677 A * 1/1981 ................ F16F 3/12
(Continued)

OTHER PUBLICATIONS

Machine Translation of FR 1476682, obtained Sep. 30, 2019.*
Machine Translation of JP 2007-299137, obtained Sep. 18, 2019.*

*Primary Examiner* — Richard W Ridley
*Assistant Examiner* — Brian J McGovern
(74) *Attorney, Agent, or Firm* — Nixon & Vanderhye, P.C.

(57) ABSTRACT

A spring damper disposed inside a coil spring includes: a main body having an outside diameter smaller than an inside diameter of a spring wire of the coil spring; and an outward convex part having a distal end located on an outer side of a cylindrical virtual plane in the radial direction, the cylindrical virtual plane passing through a center of the spring wire. When the coil spring is compressed by pressing an accelerator pedal by a driver, the outward convex part located between the adjacent spring wires prevents collision between the spring wires.

13 Claims, 11 Drawing Sheets

(51) Int. Cl.
*B60K 26/02* (2006.01)
*F16F 3/12* (2006.01)
*G05G 1/38* (2008.04)
*G05G 1/44* (2008.04)

(52) U.S. Cl.
CPC ................ *G05G 1/44* (2013.01); *G05G 5/05* (2013.01); *G05G 2505/00* (2013.01)

(58) Field of Classification Search
CPC . G05G 1/445; G05G 1/03; G05G 1/05; B60T 7/065; B60T 7/06; B60T 7/04
See application file for complete search history.

(56) References Cited

U.S. PATENT DOCUMENTS

| | | |
|---|---|---|
| 2005/0183535 A1 | 8/2005 | Makino et al. |
| 2010/0199800 A1 | 8/2010 | Horie et al. |
| 2013/0074643 A1* | 3/2013 | Saito .................... B60K 26/021 74/513 |
| 2014/0000408 A1* | 1/2014 | Saito ........................ G05G 1/44 74/513 |
| 2016/0047473 A1* | 2/2016 | Foster .................. F16J 15/3212 277/309 |

FOREIGN PATENT DOCUMENTS

| | | |
|---|---|---|
| JP | 40-12841 | 6/1965 |
| JP | 58-127233 | 8/1983 |
| JP | 2007299137 A * | 11/2007 |

* cited by examiner (a)

(b)

(c)

(a)

(b)

SPRING DAMPER AND ACCELERATOR DEVICE USING THE SPRING DAMPER

CROSS REFERENCE TO RELATED APPLICATION

This application is the U.S. national phase of International Application No. PCT/JP2016/002180 filed on Apr. 26, 2016 which designated the U.S. and claims priority to Japanese Patent Application No. 2015-114776 filed on Jun. 5, 2015, the entire contents of each of which are incorporated herein by reference.

TECHNICAL FIELD

The present disclosure relates to a spring damper that decreases vibration of a coil spring, and an accelerator device using the spring damper.

BACKGROUND ART

Conventionally, an accelerator equipment is known, which is disposed in a vehicle to control the operational status of the vehicle according to the amount of pressing an accelerator pedal by a driver. The accelerator pedal of the accelerator equipment rotates about a rotation axis of a shaft of the accelerator equipment when the driver operates. When the driver releases the accelerator pedal, the accelerator pedal rotates in the reverse direction due to a biasing force of a coil spring, and returns to the original position. For example, Patent Literature 1 describes a spring damper to decrease vibration of a double coil spring, in which the spring damper is disposed between the coil springs which return an accelerator pedal to the original position.

PRIOR ART LITERATURES

Patent Literature

Patent Literature 1: JP 2010-181008 A

SUMMARY OF INVENTION

The spring damper described in Patent Literature 1 has an outside diameter smaller than the inside diameter of the outer coil spring of the double coil spring, and has an inside diameter larger than the outside diameter of the inner coil spring of the double coil spring. When a coil spring vibrates on specific frequency, the coil spring may have comparatively large vibration according to the resonance effect. If vibration of the double coil spring in which the spring damper described in Patent Literature 1 is disposed becomes large according to the resonance effect, spring wires of the coil spring adjacent to each other may collide with each other such that abnormal noise may be generated.

The present disclosure has a purpose of providing a spring damper which prevents abnormal noise generated by collision between spring wires.

According to an aspect of the present disclosure, a spring damper disposed inside a coil spring to decrease vibration of the coil spring includes a main body and an outward convex part.

The main body is disposed to be in contact with two spring support parts that support respective ends of the coil spring, and has an outside diameter smaller than an inside diameter of a spring wire of the coil spring.

The outward convex part is disposed on an outer side of the main body in a radial direction, and has a distal end located on an outer side of a cylindrical virtual plane in the radial direction, the cylindrical virtual plane passing through a center of the spring wire.

Therefore, the distal end of the outward convex part is located on the radially outer side of the cylindrical virtual plane passing through the center of the spring wire. When the coil spring is compressed, if the spring wires adjacent to each other likely to collide with each other, the outward convex part works as a shock absorbing material. Thus, the collision between the spring wires can be prevented, and the collision sound between the spring wires can be prevented.

DESCRIPTION OF EMBODIMENTS

Figure 1:
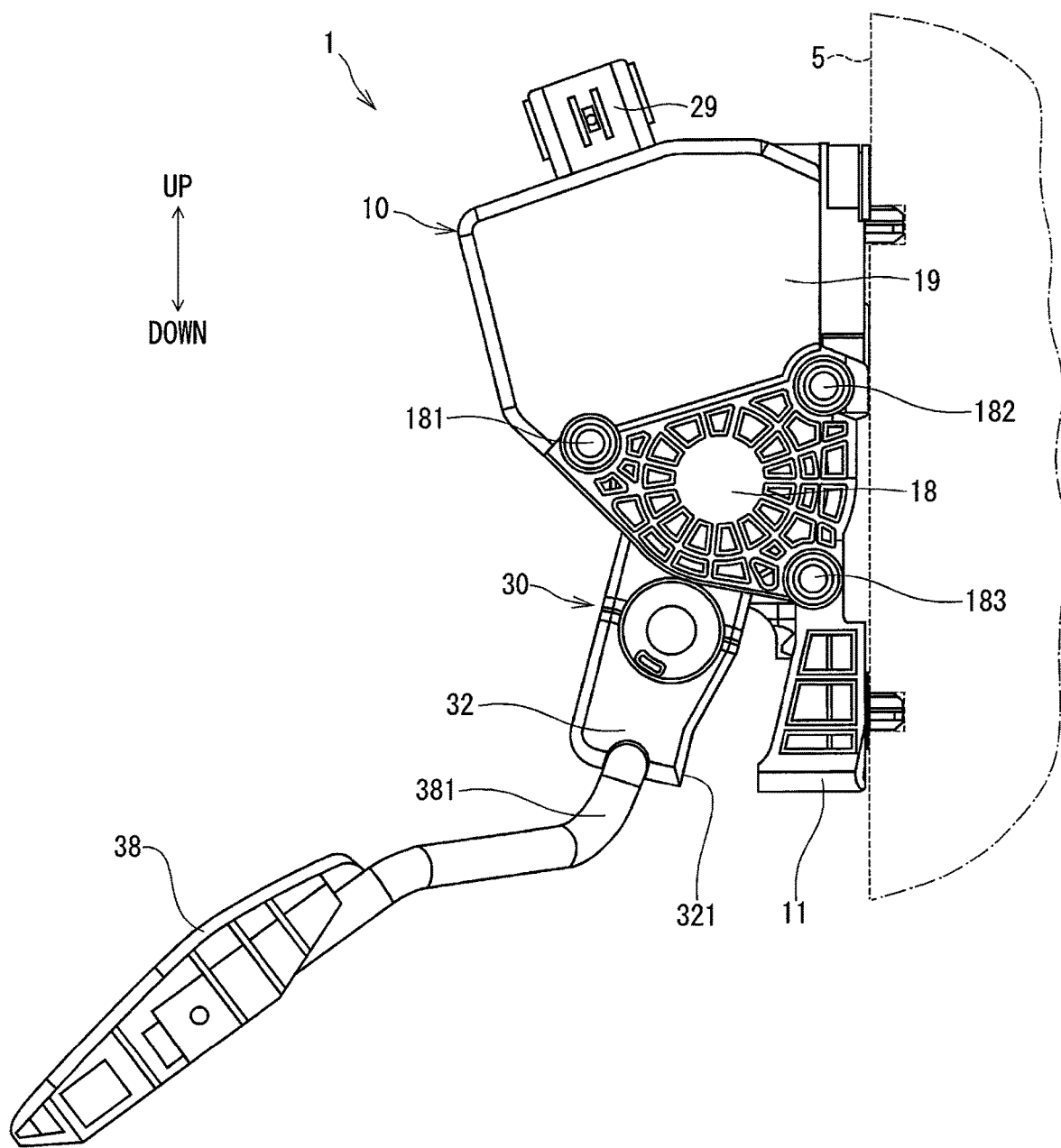
FIG. 1 is a schematic view of an accelerator device including a spring damper according to a first embodiment.

A description will hereinafter be made on embodiments on the basis of the drawings.

First Embodiment

A description will be made on an accelerator device according to a first embodiment on the basis of FIGS. 1 to 6. An accelerator device 1 according to the first embodiment is an input device that is operated by a driver of a vehicle to determine a valve opening degree of a throttle valve for a vehicular engine, which is not depicted. The accelerator device 1 is of an electronic type and transmits an electric signal based on a depression amount of an accelerator pedal 38 to an electronic control device, which is not depicted. The electronic control device drives the throttle valve by using a throttle actuator, which is not depicted, on the basis of the depression amount and other information.

The accelerator device 1 includes a housing 10 corresponding to "a support portion", a first cover 18, a second cover 19, a shaft 20, an operation member 30, the accelerator pedal 38, a pedal arm 381, a pedal spring 39, a rotation angle sensor 25 corresponding to "a rotation angle detection unit", a hysteresis mechanism portion 40, and a spring damper 35. Hereinafter, an upper side in FIGS. 1 to 3 and a lower side in FIGS. 1 to 3 will respectively be described as a "up" and a "down". However, the up-down direction in the accelerator device 1 is not limited thereto.

The housing 10 is formed in a bottomed cylindrical shape and is made of resin. The housing 10 is attached to a vehicle body 5 by three fixation bases 111, 112, 113 so as to be opened in a horizontal direction. The housing 10 has an internal space 100 that houses the shaft 20, the pedal spring 39, a part of the rotation angle sensor 25, the hysteresis mechanism portion 40, and the like. The housing 10 has a communication hole 101 on the bottom side. The communication hole 101 makes the internal space 100 communicate with outside and corresponds to a movable range of the operation member 30. On the bottom side of the communication hole 101, the housing 10 is provided with a fully opened stopper portion 11 that regulates rotation of the operation member 30 at an accelerator fully opened position. The accelerator fully opened position is a position set such that a degree of depression of the accelerator pedal 38 by the driver, that is, an accelerator opening degree becomes 100 [%].

The first cover 18 and the second cover 19 are provided to cover an opening of the housing 10. The internal space 100 communicates with the outside only via the communication hole 101 due to the housing 10, the first cover 18, and the second cover 19. The first cover 18 is fixed to the housing 10 by bolts 181, 182, 183. The second cover 19 is locked to the first cover 18. The first cover 18 and the second cover 19 prevent entry of a foreign substance into the internal space 100.

The shaft 20 is rotatably provided in the internal space 100.

The shaft 20 has an axial part 21 and a sensor housing portion 22.

The axial part 21 is formed in the shape of an approximately stick, and the sensor housing portion 22 is formed at one end. The other end of the axial part 21 is rotatably inserted in a concave space 180 defined in the first cover 18. That is, the inner wall of the first cover 18 that forms the concave space 180 serves as one bearing of the shaft 20.

The sensor housing portion 22 has an outside diameter larger than the outside diameter of the axial part 21. The sensor housing portion 22 has a space 220 open to a side opposite from the axial part 21. The sensor housing portion 22 is rotatably inserted in an opening 120 of a bottom 12 of the housing 10 which forms the bottom of the interior space 100. That is, the inner wall of the housing 10 which forms the opening 120 serves as the other bearing of the shaft 20.

Figure 2:
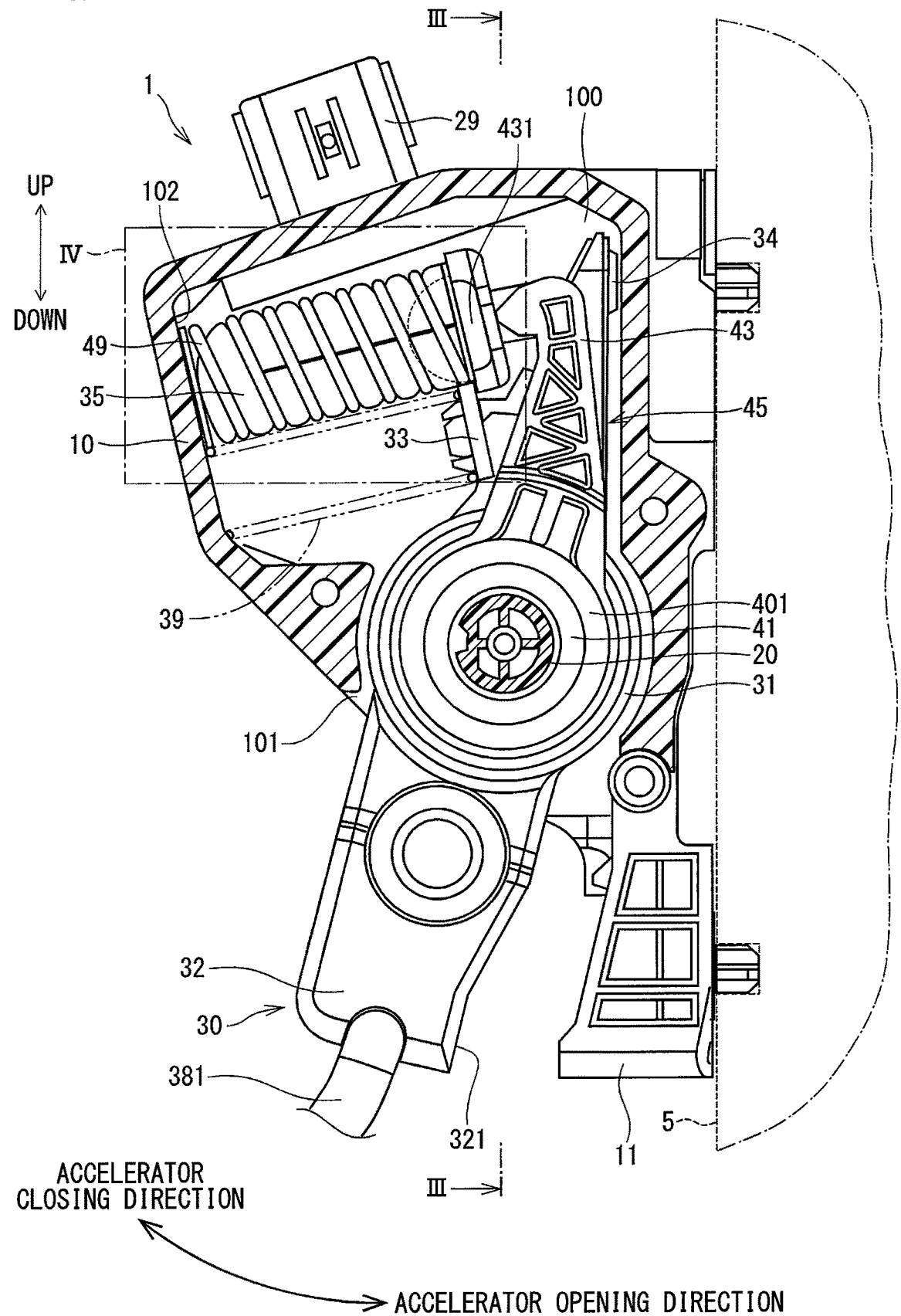
FIG. 2 is a cross-sectional view of the accelerator device according to the first embodiment.
Figure 3:
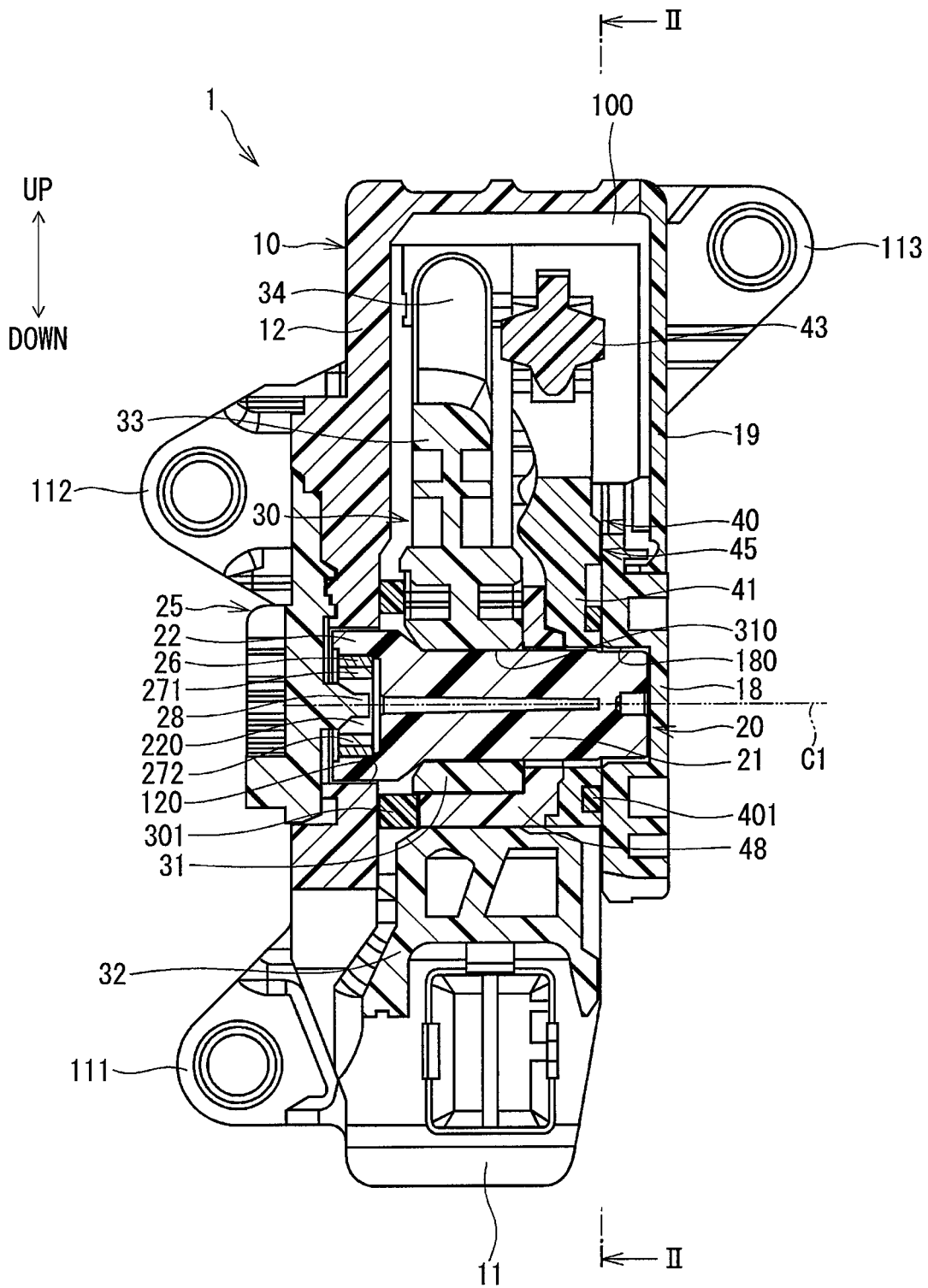
FIG. 3 is a cross-sectional view taken along a line III-Ill in FIG. 2.

In accordance with torque that is received from the operation member 30 in conjunction with a depressing operation by the driver, the shaft 20 rotates within a predetermined angle range from an accelerator fully closed position to the accelerator fully opened position. The accelerator fully closed position is a position set such that the degree of the depression of the accelerator pedal 38 by the driver, that is, the accelerator opening degree becomes 0[%]. Hereinafter, as depicted in FIG. 2, a rotation direction in which the operation member 30 moves from the accelerator fully closed position to the accelerator fully opened position side will be described as an "accelerator opening direction". Meanwhile, a rotation direction in which the operation member 30 moves from the accelerator fully opened position to the accelerator fully closed position side will be described as an "accelerator closing direction".

The operation member 30 includes a pedal boss portion 31, an arm coupling portion 32, a pedal spring receiving portion 33, and a fully closed stopper portion 34. The pedal boss portion 31, the arm coupling portion 32, the pedal spring receiving portion 33, and the fully closed stopper portion 34 are integrally formed of the resin.

The pedal boss portion 31 is provided between the bottom 12 and the first cover 18. The pedal boss portion 31 is formed in a substantially ring shape and has an insertion hole 310 through which the shaft 20 can be inserted. The shaft 20 and the operation member 30 are joined by press-fitting the shaft 20 into the insertion hole 310.

A first helical tooth, which is not depicted, is integrally formed on the first cover 18 side of the pedal boss portion 31. The plural first helical teeth are provided at equally-spaced intervals in a circumferential direction. In the circumferential direction, each of the first helical teeth protrudes toward a hysteresis rotation member 45 of the hysteresis mechanism portion 40 as moving in the accelerator closing direction and has an inclined surface in a tip portion thereof, the inclined surface approaching the hysteresis rotation member 45 as moving in the accelerator closing direction.

A first friction member 301 is provided between the pedal boss portion 31 and the bottom 12. The first friction member 301 is provided on a radially outer side of the shaft 20. When being pushed toward the bottom 12, the pedal boss portion 31 is frictionally engaged with the first friction member 301.

The arm coupling portion 32 is formed such that one end thereof is connected to an outer wall on the radially outer side of the pedal boss portion 31 and that the other end thereof passes through the communication hole 101 and extends to the bottom side of the housing 10. The other end of the arm coupling portion 32 is connected to the pedal arm 381. An end surface 321 on the accelerator opening direction side of the arm coupling portion 32 can abut against the fully opened stopper portion 11.

The pedal spring receiving portion 33 is provided such that one end thereof is connected to the outer wall on the radially outer side of the pedal boss portion 31 and that the other end thereof extends in the up direction within the internal space 100. The pedal spring receiving portion 33 locks one end portion of the pedal spring 39.

The fully closed stopper portion 34 is formed to further extend in the up direction from the pedal spring receiving portion 33. The fully closed stopper portion 34 is formed in a manner capable of abutting against an inner wall of the housing 10. The fully closed stopper portion 34 regulates the rotation of the operation member 30 in the accelerator closing direction at the accelerator fully closed position.

The accelerator pedal 38 is connected to one end portion of the pedal arm 381. The other end portion of the pedal arm 38 is fixed to the other end of the arm coupling portion 32. The accelerator pedal 38 converts the depression by the driver to rotational torque about a rotation axis C1 of the shaft 20 and transmits the rotational torque to the shaft 20.

When the accelerator pedal 38 rotates in the accelerator opening direction, a rotation angle of the shaft 20 in the accelerator opening direction with the accelerator fully closed position being a base point is increased. Corresponding to the rotation angle of the shaft 20 in the accelerator opening direction, the accelerator opening degree is increased. Meanwhile, when the accelerator pedal 38 rotates in the accelerator closing direction, the rotation angle of the shaft 20 in the accelerator closing direction is reduced. Corresponding to the rotation angle of the shaft 20 in the accelerator closing direction, the accelerator opening degree is reduced.

The pedal spring 39 is a coil spring, for example, and urges the operation member 30 in the accelerator closing direction. An urging force that is applied to the operation member 30 by the pedal spring 39 is increased as a rotation angle of the operation member 30, that is, the rotation angle of the shaft 20 is increased. In addition, the urging force is set such that the operation member 30 and the shaft 20 can be restored at the accelerator fully closed position regardless of the rotation angle of the operation member 30.

The rotation angle sensor 25 is configured by including a yoke 26, a pair of magnets 271, 272 with different magnetic poles, a hall element 28, and the like. The yoke 26 formed of a magnetic body is fixed to inside of the sensor housing portion 22 that forms the space 220. The magnets 271, 272 are fixed to oppose each other with the rotation axis C1 of the shaft 20 being interposed therebetween in a radially inner direction of the yoke 26. The hall element 28 is provided between the magnet 271 and the magnet 272.

The rotation angle sensor 25 detects a voltage that is generated in the hall element 28 in accordance with a change of a magnetic field so as to detect a relative rotation angle between the hall element 28 and the magnets 271, 272, that is, the rotation angle of the shaft 20 with respect to the housing 10. The rotation angle sensor 25 transmits the electric signal based on the detected rotation angle to the non-illustrated electronic control device on the outside via an external connector 29 provided on top of the accelerator device 1.

The hysteresis mechanism portion 40 includes: the hysteresis rotation member 45 that is integrally formed with a hysteresis boss portion 41, a hysteresis spring receiving portion 43, and the like; an intermediate member 48; a second friction member 401; and a hysteresis spring 49 corresponding to "a coil spring".

The hysteresis boss portion 41 is provided between the pedal boss portion 31 and the first cover 18 in a radially outer direction of the shaft 20. The hysteresis boss portion 41 can rotate relative to the shaft 20 and the pedal boss portion 31 and can approach or separate from the pedal boss portion 31.

In the internal space 100, the hysteresis spring receiving portion 43 is formed to extend in the up direction from the hysteresis boss portion 41. The hysteresis spring receiving portion 43 has a locking portion 431 in an end portion on an opposite side from a side connected to the hysteresis boss portion 41, the locking portion 431 locking one end portion of the hysteresis spring 49.

The intermediate member 48 is provided between the hysteresis boss portion 41 and the pedal boss portion 31. The intermediate member 48 can rotate relative to the shaft 20 and the pedal boss portion 31 in an integral manner with the hysteresis rotation member 45 and can approach or separate from the pedal boss portion 31. A second helical tooth, which is not depicted, is integrally formed on the pedal boss portion 31 side of the intermediate member 48. The plural second helical teeth are provided at equally-spaced intervals in the circumferential direction. In the circumferential direction, each of the second helical teeth protrudes to the pedal boss portion 31 side as moving in the accelerator opening direction and has an inclined surface in a tip portion thereof, the inclined surface approaching the hysteresis boss portion 41 toward the accelerator opening direction. The inclined surfaces of the first helical tooth and the second helical tooth abut against each other in the circumferential direction. The first helical tooth and the second helical tooth can transmit mutual rotation thereof between the pedal boss portion 31 and the hysteresis boss portion 41 via the intermediate member 48.

When the rotation angle of the pedal boss portion 31 is located on the accelerator fully opened position side from the accelerator fully closed position, the inclined surfaces of the first helical tooth and the second helical tooth are engaged with each other and separate the pedal boss portion 31 and each of the intermediate member 48 and the hysteresis boss portion 41 from each other. At this time, the first helical tooth pushes the pedal boss portion 31 to the bottom portion 12 side with a larger force as the rotation angle of the pedal boss portion 31 from the accelerator fully closed position is increased. Meanwhile, the second helical tooth pushes the hysteresis boss portion 41 to the first cover 18 side with a larger force as the rotation angle of the pedal boss portion 31 from the accelerator fully closed position is increased.

The second friction member 401 is provided between the hysteresis rotation member 45 and the first cover 18 in the radially outer direction of the shaft 20. The hysteresis rotation member 45 is frictionally engaged with the second friction member 401 when the hysteresis rotation member 45 is pressed in a direction to separate from the pedal boss portion 31, that is, to the first cover 18 side. A friction force between the hysteresis rotation member 45 and the second friction member 401 is rotation resistance of the hysteresis rotation member 45.

Figure 4:
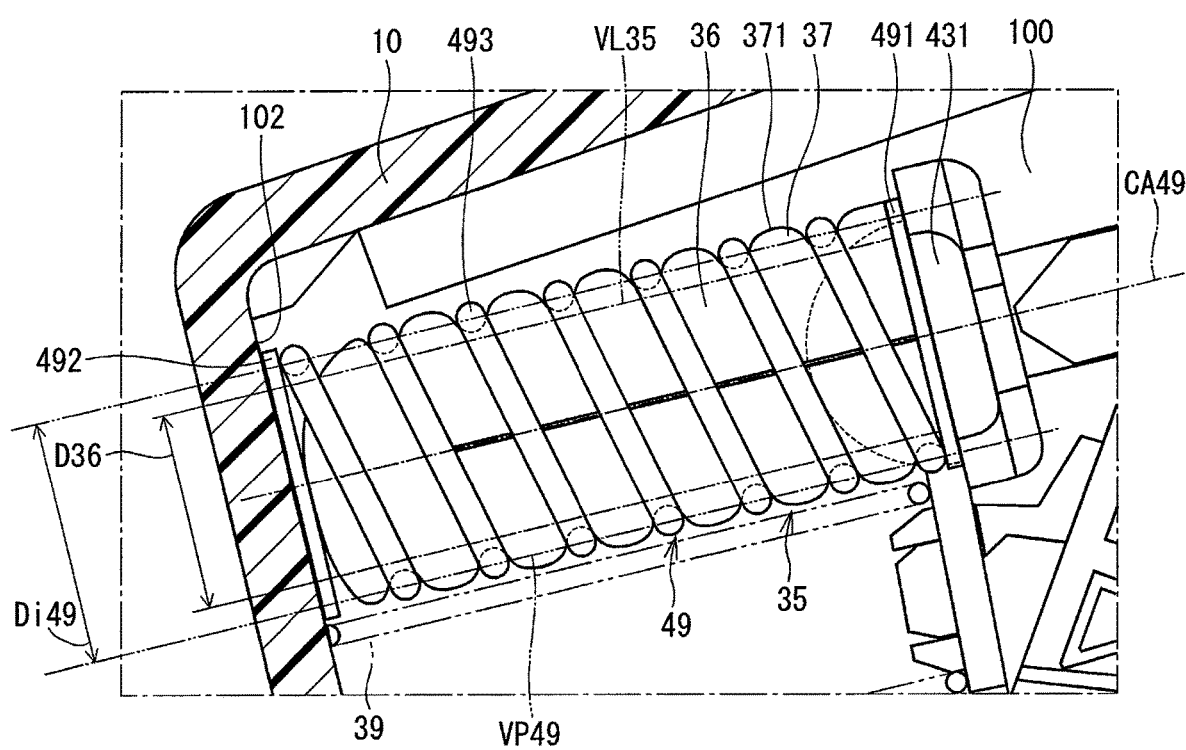
FIG. 4 is an enlarged view of a section IV in FIG. 2.

The hysteresis spring 49 is a coil spring. As shown in FIG. 4, the hysteresis spring 49 is formed of two end turn parts 491, 492 respectively in contact with the locking part 431 and the inner wall 102 of the housing 10 corresponding to "a spring support part", and a spring wire 493 formed spirally between the two end turn parts 491 and 492. The hysteresis spring 49 urges the hysteresis rotation member 45 in the accelerator closing direction. An urging force of the hysteresis spring 49 is increased as the rotation angle of the hysteresis boss portion 41 is increased. Torque that is received by the hysteresis boss portion 41 due to urging of the hysteresis spring 49 is transmitted to the pedal boss portion 31 via the second helical teeth and the first helical teeth.

The spring damper 35 is disposed inside the hysteresis spring 49. The spring damper 35 is made of a material having flexibility such as foaming material, and can decrease vibration of the hysteresis spring 49.

The spring damper 35 is formed of a main body 36 and an outward convex part 37. A single chain line VL 35 of FIG. 4 illustrates an imaginary boundary between the main body 36 and the outward convex part 37 for convenience. A double chain line VP49 of FIG. 4 illustrates a cross-sectional line of a cylindrical virtual plane parallel to the central axis CA49 of the hysteresis spring 49 and passing through the center of the spring wire 493 of the hysteresis spring 49.

The main body 36 is a portion located inside of the spring wire 493 in the radial direction. The main body 36 is formed to be in contact with the locking part 431 and the inner wall 102 of the housing 10. The outside diameter D36 of the main body 36 is smaller than inside diameter Di49 of the spring wire 493.

The outward convex part 37 is located on the outer side of the main body 36 in the radial direction. The outward convex part 37 has a distal end 371 as "an end portion" on the radially outer side. The distal end 371 is located on the radially outer side of the cylindrical virtual plane VP49 passing through the center of the spring wire 493 of the hysteresis spring 49. That is, in FIG. 4, the distal end 371 is located at a position distant from the central axis CA49 more than the double chain line VP49. Thereby, the outward convex part 37 is spirally formed between the end turn part 491 and the spring wire 493 adjacent to each other, between the spring wires 493 adjacent to each other, and between the end turn part 492 and the spring wire 493 adjacent to each other.

Next, a manufacturing process of the accelerator device 1 will be described.

The shaft 20, the operation component 30, the pedal spring 39, the intermediate member 48, and the hysteresis rotation component 45 are set in the housing 10. Moreover, the spring damper 35 is inserted into the hysteresis spring 49, apart from the process of setting the shaft 20 and the like in the housing 10. This insertion method is explained based on FIG. 5.

Figure 5:
FIG. 5 is a schematic diagram explaining an assembly method of the accelerator device of the first embodiment.
Figure 5:
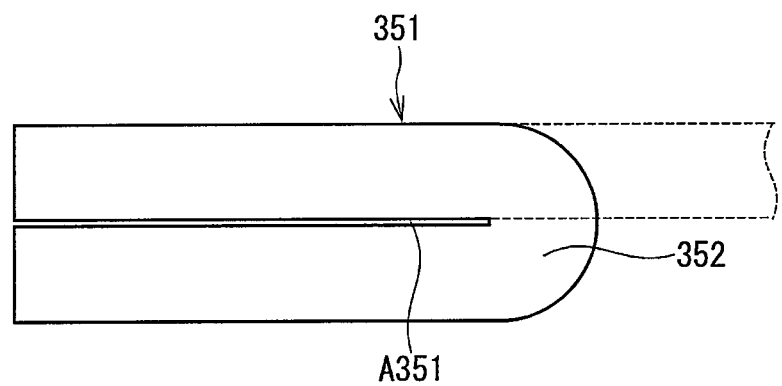
Figure 5:
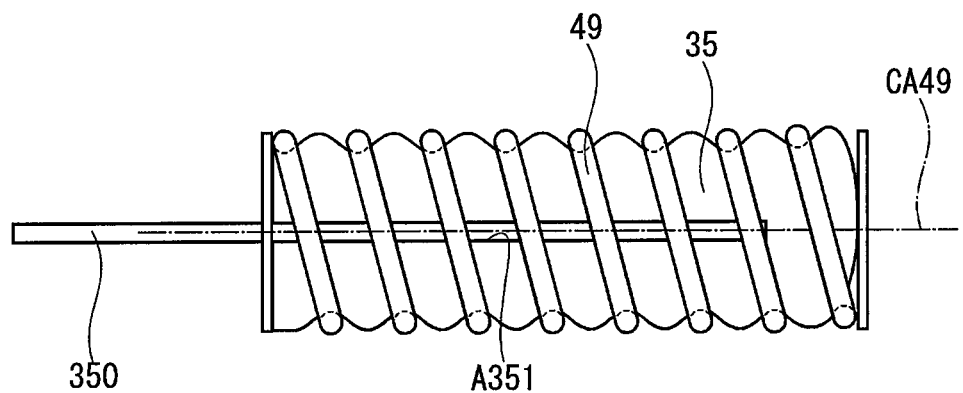

The spring damper 35 before being inserted into the hysteresis spring 49 is shown in (a) of FIG. 5. The spring damper 35 before being inserted into the hysteresis spring 49 is an approximately rectangle tabular component in the cross-sectional form. Here, for convenience, the spring damper 35 before being inserted inside the hysteresis spring 49 is referred to a pre-insertion component 351 in FIG. 5. The length of the pre-insertion component 351 in the longitudinal direction is, for example, about 2 times of the length of the hysteresis spring 49 in the central axis CA49 direction, in the accelerator device 1 in the accelerator closed state.

Next, as shown in (b) of FIG. 5, the pre-insertion component 351 is folded at approximately the center into two layers. Next, the pre-insertion component 351 folded into the two layers is inserted inside the hysteresis spring 49 from the folded part 352. At this time, a rod insertion jig 350 is inserted into a clearance A351 between the two layers of the pre-insertion component 351, and the pre-insertion component 351 currently folded into the two layers is pushed in the central axis CA49 direction of the hysteresis spring 49 using the insertion jig 350. Thereby, the pre-insertion component 351 is set inside the hysteresis spring 49, to define the spring damper 35 (refer to (c) of FIG. 5).

The hysteresis spring 49 in which the spring damper 35 was set is attached between the locking part 431 and the inner wall 102. At this time, the outward convex part 37 is located between the adjacent spring wires 493 and between the end turn part 491 and the spring wire 493 adjacent to each other (refer to FIG. 4).

Next, the first cover 18 and the second cover 19 are assembled to the housing 10. Moreover, the rotation angle sensor 25 is assembled to a side of the housing 10 opposite from the first cover 18 and the second cover 19.

Finally, the pedal arm 381 and the accelerator pedal 38 are assembled to the operation member 30, and the accelerator device 1 is completed.

Next, an operation of the accelerator device 1 will be described.

When the accelerator pedal 38 is depressed, the operation member 30 rotates with the shaft 20 about the rotation axis C1 of the shaft 20 in the accelerator opening direction in accordance with a depression force applied to the accelerator pedal 38. At this time, for the rotation of the operation member 30 and the shaft 20, the depression force that generates the higher torque than a sum of the torque generated by the urging forces of the pedal spring 39 and the hysteresis spring 49 and resistance torque generated by the friction forces of the first friction member 301 and the second friction member 401 is necessary.

For example, in order to maintain the depression of the accelerator pedal 38 after the driver depresses the accelerator pedal 38, the depression force that generates the higher torque than a difference between the torque generated by the urging forces of the pedal spring 39 and the hysteresis spring 49 and the resistance torque generated by the friction forces of the first friction member 301 and the second friction member 401 only has to be applied. That is, in the case where the driver attempts to maintain the depression of the accelerator pedal 38 after depressing the accelerator pedal 38, the driver may reduce the depression force to certain extent.

In order to make the depressed accelerator pedal 38 return to the accelerator fully closed position side, the depression force that generates the lower torque than the difference between the torque generated by the urging forces of the pedal spring 39 and the hysteresis spring 49 and the resistance torque generated by the friction forces of the first friction member 301 and the second friction member 401 is applied. When the accelerator pedal 38 is promptly returned to the accelerator fully closed position, the depression of the accelerator pedal 38 only has to be canceled, and thus a burden is not added to the driver. Meanwhile, when the accelerator pedal 38 is gradually returned, the predetermined depression force has to continuously be applied. At this time, the depression force that is required to gradually cancel the depression has a relatively small value.

Figure 6:
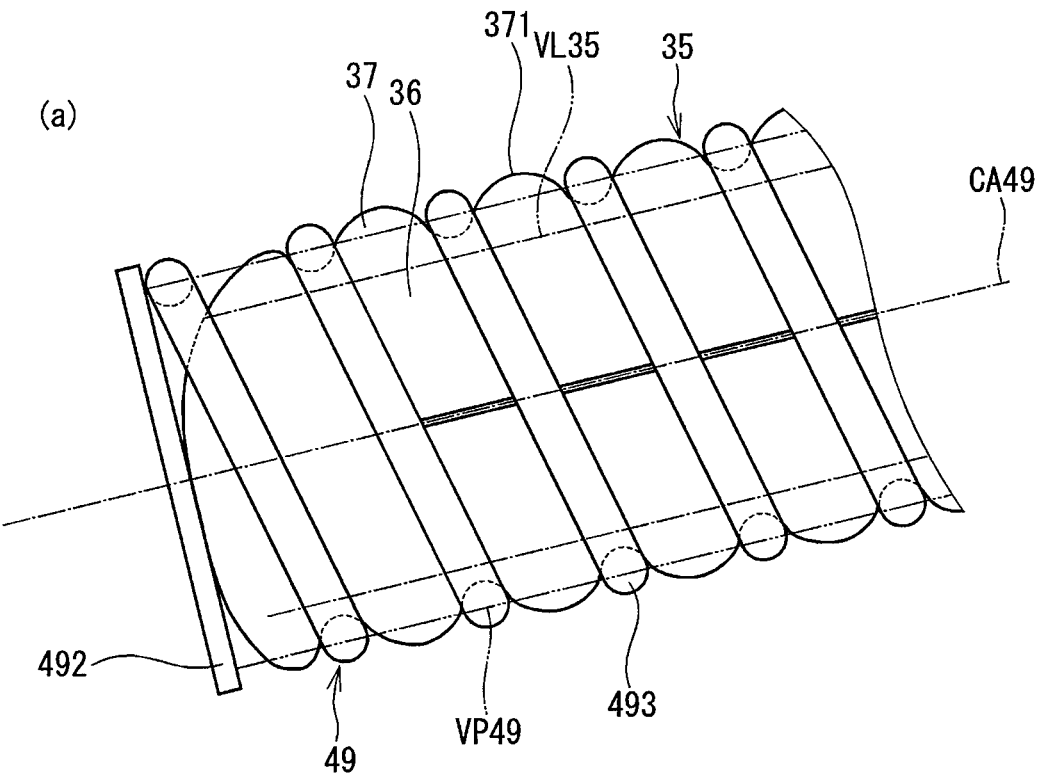
FIG. 6 is a schematic diagram explaining an action of the spring damper of the first embodiment.
Figure 6:
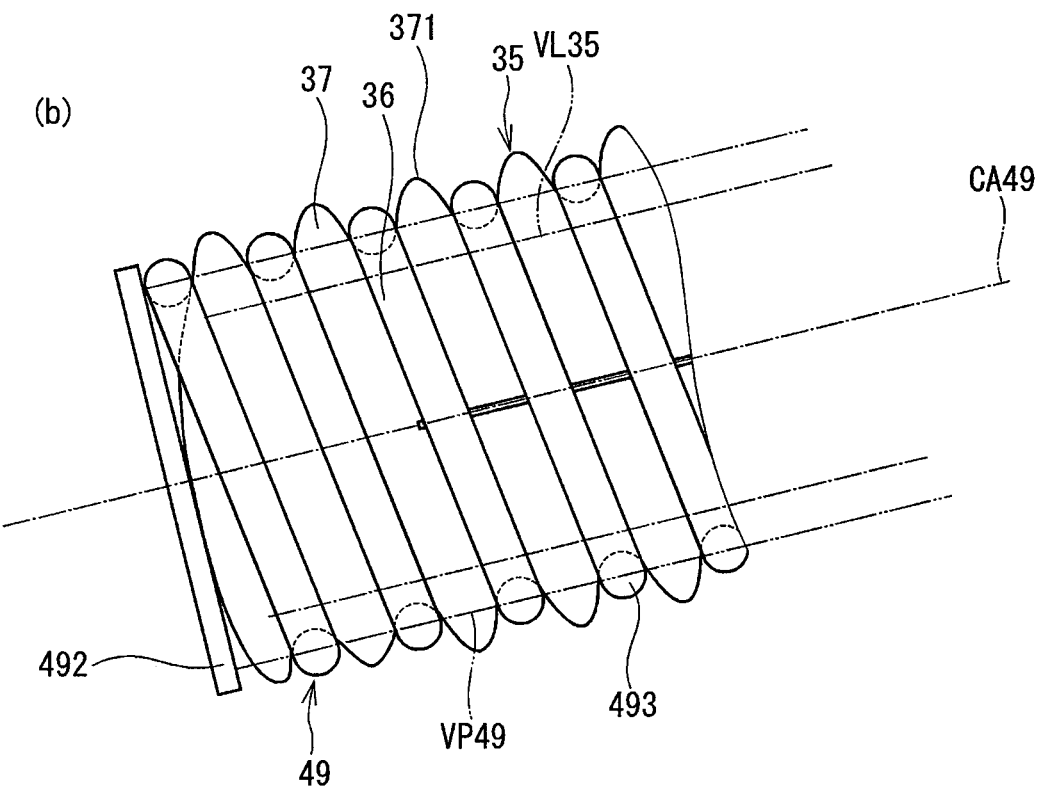

(a) When a driver presses down the accelerator pedal 38, the hysteresis spring 49 is compressed into a state shown in (b) of FIG. 6 from a state shown in (a) of FIG. 6. At this time, the adjacent spring wires 493 of the hysteresis spring 49 approach each other. According to the accelerator device 1 of the first embodiment, since the outward convex part 37 is formed between the adjacent spring wires 493, the outward convex part 37 works as a shock absorbing material to prevent the collision between the spring wires 493 while the adjacent spring wires 493 become too close to each other. Therefore, abnormal noise caused by the collision between the spring wires 493 can be prevented.

(b) Moreover, in the first embodiment, the outward convex part 37 is formed also between the spring wire 493 and the end turn part 491 adjacent to each other and between the spring wire 493 and the end turn part 492 adjacent to each other (refer to FIG. 4). Thereby, when the hysteresis spring 49 is compressed, the collision between the end turn part 491 and the spring wire 493, and the collision between the end turn part 492 and the spring wire 493 can be prevented. Therefore, abnormal noise caused by the collision between the end turn part 491, 492 and the spring wire 493 can be prevented.

(c) According to the first embodiment, the pre-insertion component 351 folded into the two layers is inserted into the hysteresis spring 49 from the folded part 352, such that the spring damper 35 is set inside the hysteresis spring 49. Thus, the spring damper 35 can be attached to the hysteresis spring 49 comparatively easily.

Second Embodiment

A description will be made on an accelerator device according to a second embodiment on the basis of FIGS. 7 and 8. The second embodiment differs from the first embodiment in terms of the shape of the spring damper. Note that the substantially same portion as that in the first embodiment is denoted by the same reference sign, and the description thereon will not be made.

Figure 7:
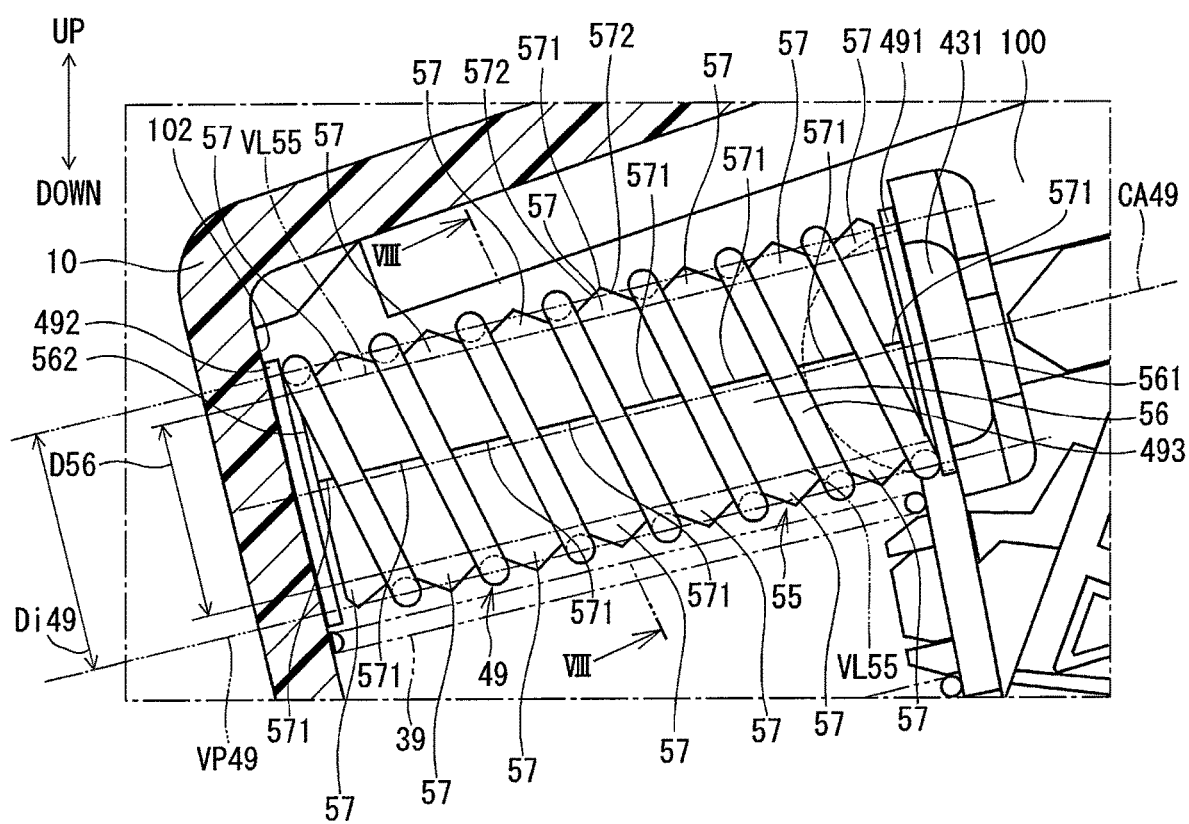
FIG. 7 is an enlarged view of an accelerator device including a spring damper according to a second embodiment.
Figure 8:
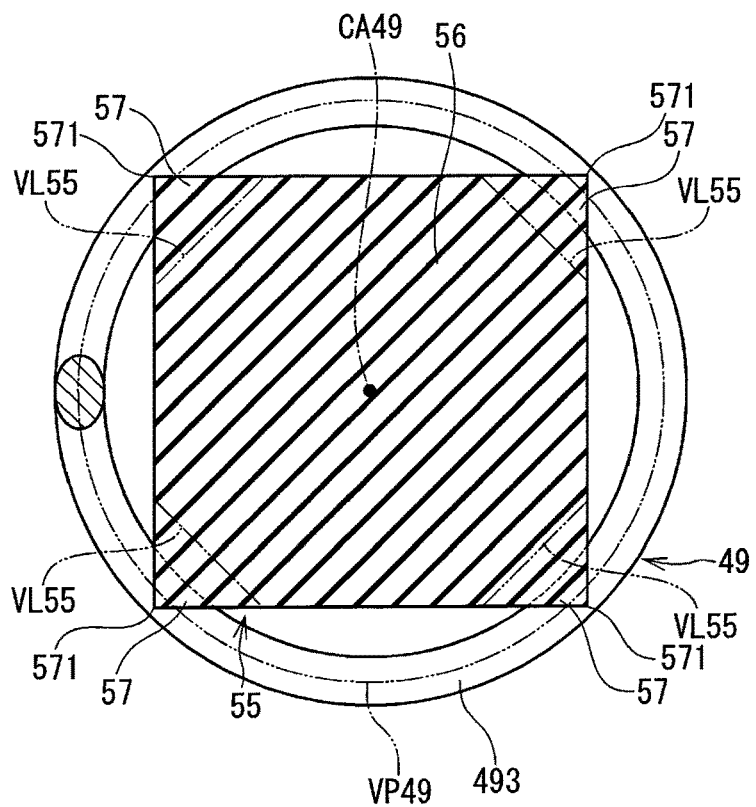
FIG. 8 is a cross-sectional view of the spring damper of the second embodiment.

FIG. 7 illustrates a partial sectional view of the accelerator device of the second embodiment. The accelerator device of the second embodiment includes the spring damper 55. The spring damper 55 is arranged inside the hysteresis spring 49. The spring damper 55 is formed in an approximately pillar shape and is made of rubber. The spring damper 55 can decrease vibration of the hysteresis spring 49.

The spring damper 55 includes the main body 56 and the outward convex part 57. In FIGS. 7 and 8, an imaginary boundary between the main body 56 and the outward convex part 57 is shown in a double chain line VL55 for convenience. As shown in FIG. 8, the spring damper 55 is formed in square in the cross-sectional form perpendicular to the central axis CA49 of the hysteresis spring 49, which may result in a space or gap between hysteresis spring 49 and the spring damper 55 as illustrated.

The main body 56 is a pillar-shaped part currently formed so that the cross-section perpendicular to the central axis CA49 of the hysteresis spring 49 has an approximately octagon shape. The outside diameter D56 of the main body 56 is smaller than the inside diameter Di49 of the spring wire 493. At an accelerator fully closed time, an end surface 561 of the main body 56 in the central axis CA49 direction maintains the state spaced from the locking part 431, and an end surface 562 of the main body 56 in the central axis CA49 direction maintains the state spaced from the inner wall 102. When the hysteresis spring 49 is compressed by pressing the accelerator pedal 38 by a driver, the end surfaces 561 and 562 are respectively in contact with the inner wall 102 and the locking part 431.

The outward convex part 57 is formed on the radially outer wall of the main body 56 at equal interval. In the second embodiment, the outward convex part 57 is formed at four places in the circumferential direction. The outward convex part 57 has an approximately triangle shape in the cross-sectional form perpendicular to the central axis CA49. The outward convex part 57 is formed to have the distal end 571 as "an end portion" on the outer side in the radial direction which is located on the radially outer side of the cylindrical virtual plane VP49 passing through the center of the spring wire 493. Thereby, as shown in FIG. 7, the outward convex part 57 is located between the spring wires 493 adjacent to each other, and between the end turn part 491, 492 and the spring wire 493 adjacent to each other.

As shown in FIG. 7, the outward convex part 57 has a slope surface 572 inclined from the distal end 571 toward the outer wall of the main body 56 along the central axis CA49 direction. In FIG. 7, the distal end 571 and the slope surface 572 are shown relative to one outward convex part 57 on the upper side, to avoid confusion, but each of the outward convex parts 57 of the spring damper 55 has the distal end and the slope surface 572.

In the second embodiment, the outward convex part 57 is located between the spring wires 493 adjacent to each other and between the end turn part 491, 492 and the spring wire 493 adjacent to each other. Thereby, the second embodiment exhibits the effects (a) and (b) of the first embodiment.

Moreover, in the second embodiment, the spring wire 493 is located between two of the slope surfaces 572 each of which is connected to the adjacent distal end 571. Thereby, the positional deviation of the spring damper 55 to the hysteresis spring 49 can be prevented.

Third Embodiment

Figure 9:
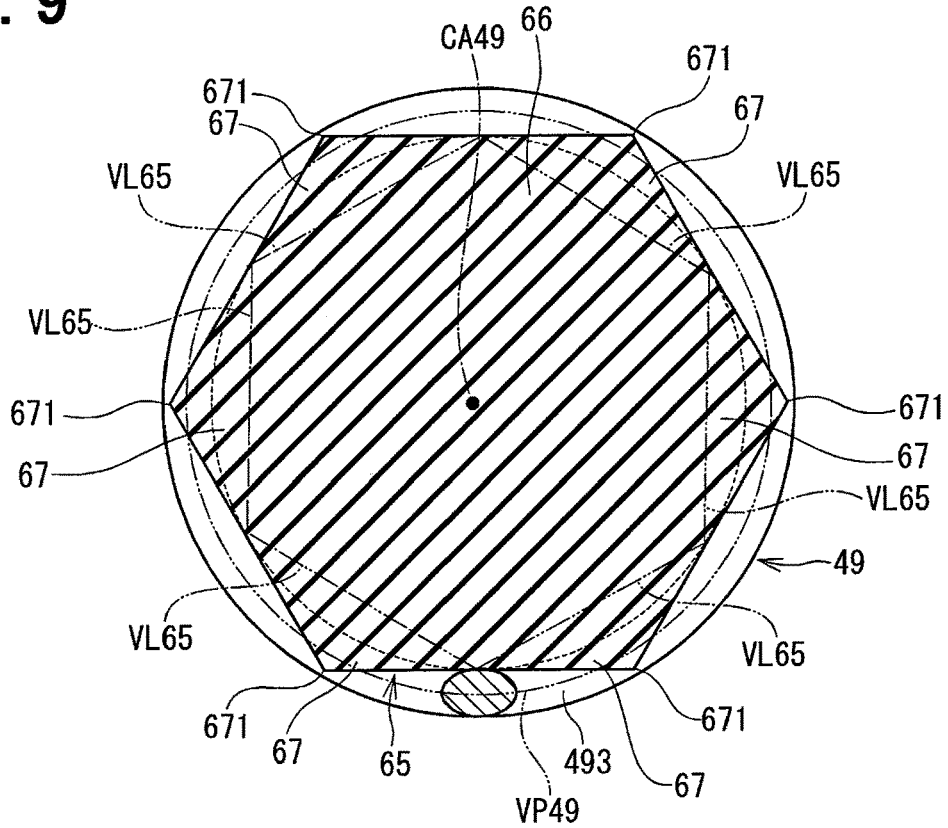
FIG. 9 is a cross-sectional view of a spring damper according to a third embodiment.

An accelerator device according to a third embodiment is explained based on FIG. 9. The third embodiment differs in the form of a spring damper from the second embodiment. Note that the substantially same portion as that in the second embodiment is denoted by the same reference sign, and the description thereon will not be made.

FIG. 9 illustrates a sectional view of the spring damper 65 of the accelerator device of the third embodiment.

The spring damper 65 includes the main body 66 and the outward convex part 67. In FIG. 9, an imaginary boundary between the main body 66 and the outward convex part 67 is shown in a double chain line VL65 for convenience. The spring damper 65 is formed in hexagon in the cross-sectional form perpendicular to the central axis CA49 of the hysteresis spring 49.

The main body 66 is a pillar-shaped part currently formed so that the cross-section perpendicular to the central axis CA49 of the hysteresis spring 49 has a hexagon shape. The main body 66 is formed to have an outside diameter smaller than the inside diameter Di49 of the spring wire 493.

The outward convex part 67 is formed on the radially outer wall of the main body 66 at equal interval. In the third embodiment, the outward convex part 67 is formed at six places in the circumferential direction. The outward convex part 67 has an approximately triangle shape in the cross-sectional form perpendicular to the central axis CA49. The outward convex part 67 is formed to have the distal end 671 as "an end portion" on the outer side in the radial direction which is located on the radially outer side of the cylindrical virtual plane VP49 passing through the center of the spring wire 493. Thereby, the outward convex part 67 is located between the spring wires 493 adjacent to each other, and between the end turn part 491, 492 and the spring wire 493 adjacent to each other.

In the third embodiment, the distal end 671 of the outward convex part 67 is located between the spring wires 493 adjacent to each other and between the end turn part 491, 492 and the spring wire 493 adjacent to each other. Thereby, the third embodiment exhibits the effects (a) and (b) of the first embodiment.

Fourth Embodiment

Figure 10:
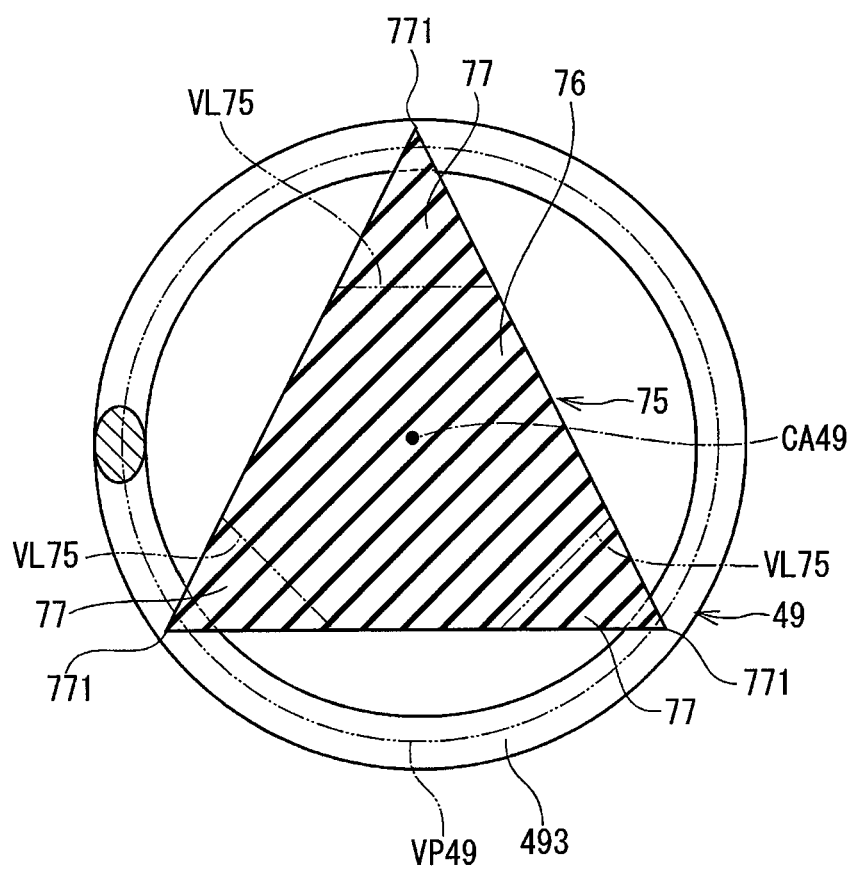
FIG. 10 is a cross-sectional view of a spring damper according to a fourth embodiment.

An accelerator device according to a fourth embodiment is explained based on FIG. 10. The fourth embodiment differs in the form of a spring damper from the second embodiment. Note that the substantially same portion as that in the second embodiment is denoted by the same reference sign, and the description thereon will not be made.

FIG. 10 illustrates a sectional view of the spring damper 75 of the accelerator device of the fourth embodiment.

The spring damper 75 includes the main body 76 and the outward convex part 77. In FIG. 10, an imaginary boundary between the main body 76 and the outward convex part 77 is shown in a double chain line VL75 for convenience. The spring damper 75 is formed in approximately a triangle in the cross-sectional form perpendicular to the central axis CA49 of the hysteresis spring 49.

The main body 76 is a pillar-shaped part currently formed so that the cross-section perpendicular to the central axis CA49 of the hysteresis spring 49 has an approximately hexagon shape. The main body 76 is formed to have an outside diameter smaller than the inside diameter Di49 of the spring wire 493.

The outward convex part 77 is formed on the radially outer wall of the main body 76 at equal interval. In the fourth embodiment, the outward convex part 77 is formed at three places in the circumferential direction. The outward convex part 77 has an approximately triangle shape in the cross-sectional form perpendicular to the central axis CA49. The outward convex part 77 is formed to have the distal end 771 as "an end portion" on the outer side in the radial direction which is located on the radially outer side of the cylindrical virtual plane VP49 passing through the center of the spring wire 493. Thereby, the outward convex part 77 is located between the spring wires 493 adjacent to each other, and between the end turn part 491, 492 and the spring wire 493 adjacent to each other.

In the fourth embodiment, the distal end 771 of the outward convex part 77 is located between the spring wires 493 adjacent to each other and between the end turn part 491, 492 and the spring wire 493 adjacent to each other. Thereby, the fourth embodiment exhibits the effects (a) and (b) of the first embodiment.

Fifth Embodiment

Figure 11:
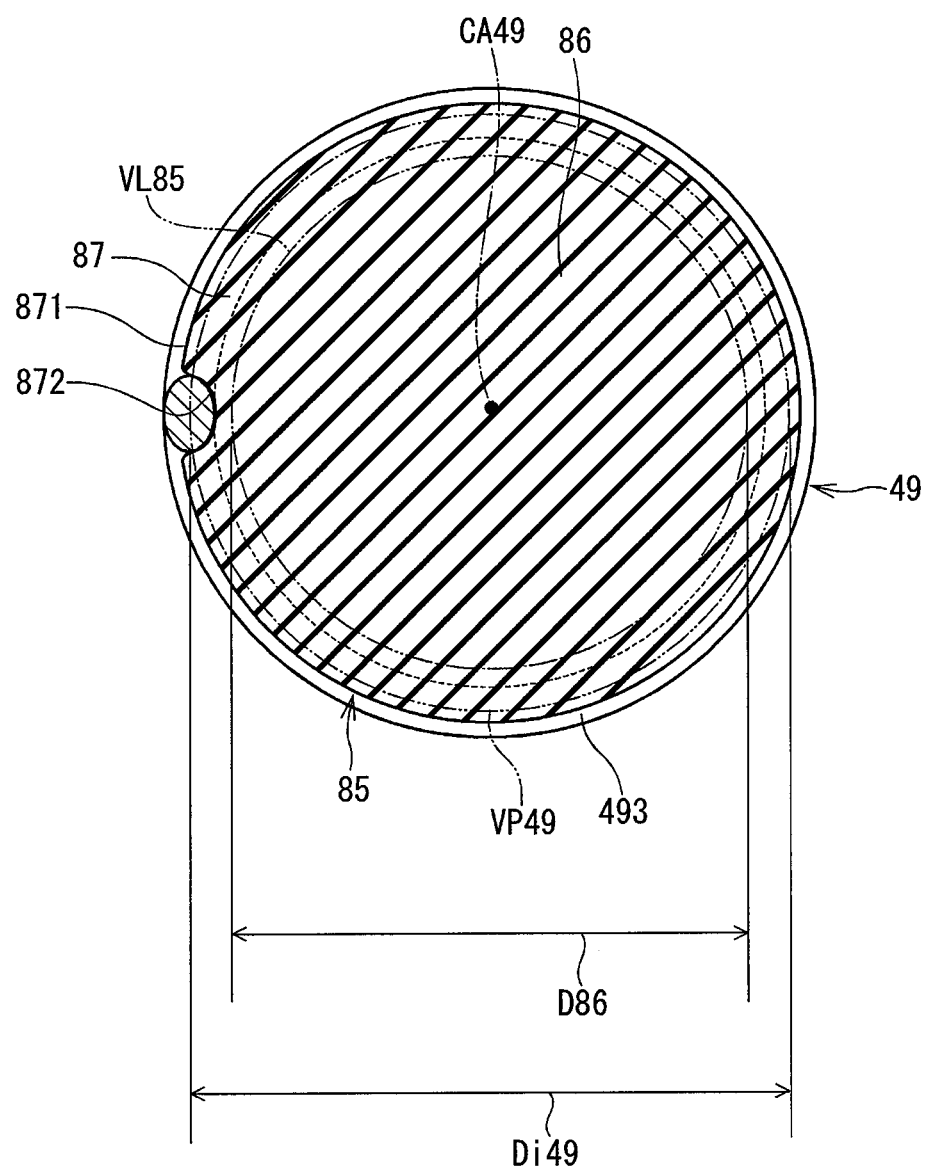
FIG. 11 is a cross-sectional view of a spring damper according to a fifth embodiment.

An accelerator device according to a fifth embodiment is explained based on FIG. 11. The fifth embodiment differs in the form of a spring damper from the second embodiment. Note that the substantially same portion as that in the second embodiment is denoted by the same reference sign, and the description thereon will not be made.

FIG. 11 illustrates a sectional view of the spring damper 85 of the accelerator device of the fifth embodiment.

The spring damper 85 includes the main body 86 and the outward convex part 87. In FIG. 11, an imaginary boundary between the main body 86 and the outward convex part 87 is shown in a double chain line VL85 for convenience. The spring damper 85 is formed in approximately circle form in the cross-section perpendicular to the central axis CA49 of the hysteresis spring 49.

The main body 86 is a pillar-shaped part currently formed so that the cross-section perpendicular to the central axis CA49 of the hysteresis spring 49 has circle form. The main body 86 is formed to have an outside diameter D86 smaller than the inside diameter Di49 of the spring wire 493.

The outward convex part 87 is formed to cover the radially outer wall of the main body 86. The outward convex part 87 has a groove 872 formed spirally. The spring wire 493 is located in the groove 872. Thereby, the outer wall 871 as "an end portion" on the radially outer side of the outward convex part 87 is spirally formed along the spring wire 493. The outer wall 871 is located on the radially outer side of the cylindrical virtual plane VP49 passing through the center of the spring wire 493. Thereby, the outward convex part 87 is located between the spring wires 493 adjacent to each other, and between the end turn part 491, 492 and the spring wire 493 adjacent to each other.

In the fifth embodiment, the outer wall 871 of the outward convex part 87 is located between the spring wires 493 adjacent to each other and between the end turn part 491, 492 and the spring wire 493 adjacent to each other. Thereby, the fifth embodiment exhibits the effects (a) and (b) of the first embodiment.

Moreover, the spring wire 493 is disposed in the groove 872 defined in the outward convex part 87. Thereby, the positional deviation of the spring damper 75 to the hysteresis spring 49 can be prevented.

Sixth Embodiment

Figure 12:
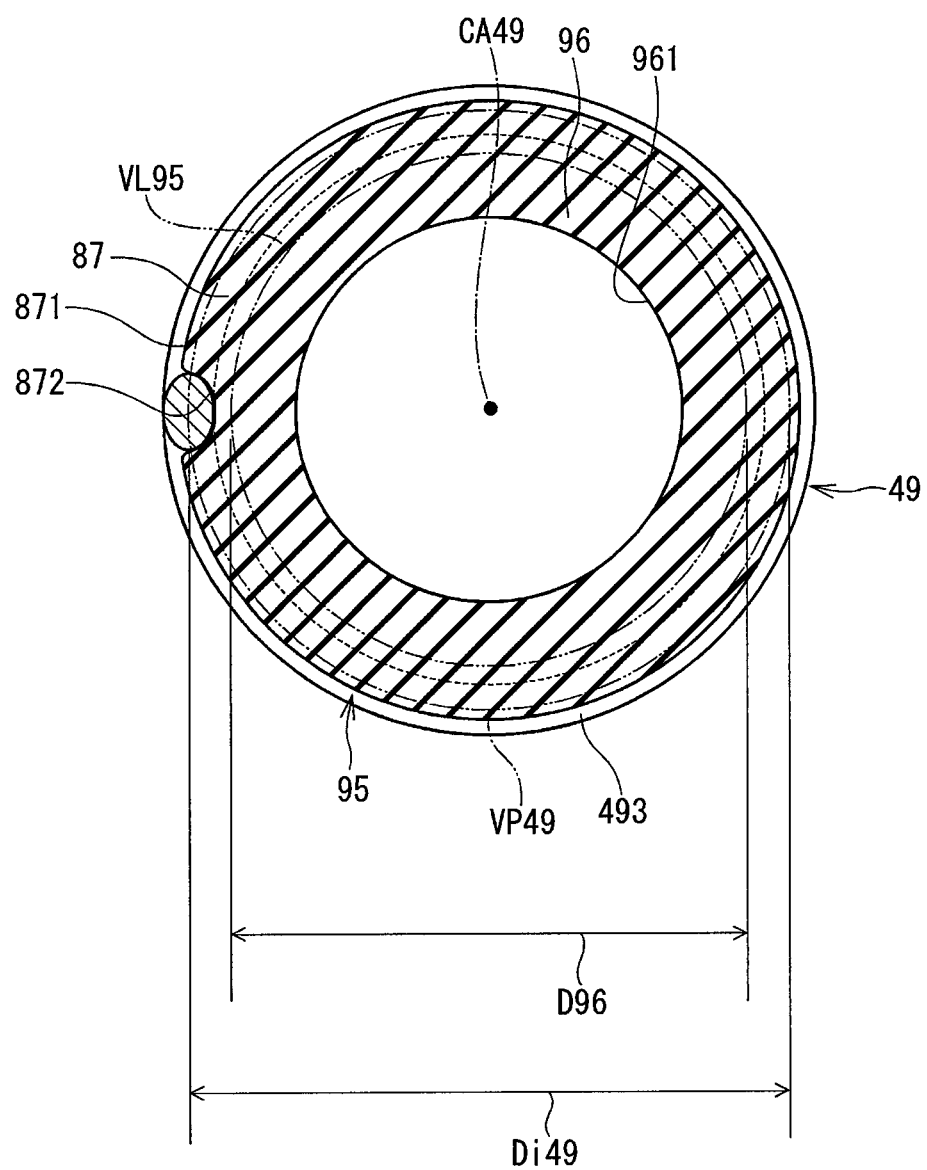
FIG. 12 is a cross-sectional view of a spring damper according to a sixth embodiment.

An accelerator device according to a sixth embodiment is explained based on FIG. 12. The sixth embodiment differs in the form of a main body from the fifth embodiment. Note that the substantially same portion as that in the fifth embodiment is denoted by the same reference sign, and the description thereon will not be made.

FIG. 12 illustrates a sectional view of the spring damper 95 of the accelerator device of the sixth embodiment.

The spring damper 95 includes the main body 96 and the outward convex part 87. In FIG. 12, an imaginary boundary between the main body 96 and the outward convex part 87 is shown in a double chain line VL95 for convenience. The spring damper 95 is formed in an approximately ring shape in the cross-section perpendicular to the central axis CA49 of the hysteresis spring 49.

The main body 96 is a pipe part currently formed so that the cross-section perpendicular to the central axis CA49 of the hysteresis spring 49 has a ring form. The main body 96 is formed to have the outside diameter D96 smaller than the inside diameter Di49 of the spring wire 493. The main body 96 has a through hole 961 at approximately the center.

In the sixth embodiment, the outer wall 871 of the outward convex part 87 is located between the spring wires 493 adjacent to each other and between the end turn part 491, 492 and the spring wire 493 adjacent to each other. Thereby, the sixth embodiment achieves the same effect as the fifth embodiment.

Moreover, the locking part 431 is inserted in the through hole 961 in the sixth embodiment. Thereby, the positional deviation of the spring damper 95 to the locking part 431 can be prevented.

OTHER EMBODIMENTS

In the above-mentioned embodiment, the spring damper is disposed inside the hysteresis spring of the accelerator device. However, the spring damper may be disposed inside a pedal spring of the accelerator device, or may be disposed inside "a coil spring" of a device other than the accelerator device.

In the above-mentioned embodiment, the main body is shaped in approximately octagon, right hexagon, approximately hexagon, approximately triangle, circle or ring in the cross-sectional form. Moreover, the outward convex part is formed in approximately triangle in the cross-sectional form, or is formed to cover the radially outer wall of the main body. However, the forms of the main body and the outward convex part are not limited. The main body is disposed to be in contact with the locking part and the inner wall of the housing, and is formed to have an outside diameter smaller than the inside diameter of the spring wire. The outward convex part is located on the outer side of the main body in the radial direction, and is formed so that the distal end on the outer side in the radial direction is located on the radially outer side of the cylindrical virtual plane passing through the center of the spring wire.

In the above-mentioned embodiment, the outward convex part is arranged between the adjacent spring wires and between the end turn part and the spring wire. However, the outward convex part may be arranged at least one of between the adjacent spring wires and between the end turn part and the spring wire.

In the second embodiment, the outward convex part has a slope surface inclined toward the outer wall of the main body from the distal end. However, the slope surface may be omitted. Moreover, in the third to sixth embodiments, the outward convex part may have a slope surface.

In the second to fourth embodiments, the main body may have a through hole defined in the main body of the sixth embodiment.

In the first embodiment, the spring damper is made of foaming material. In the second to sixth embodiments, the spring damper is made of rubber. The material forming the spring damper is not limited to these, while the spring damper is disposed inside the hysteresis spring to decrease vibration of the hysteresis spring.

In the sixth embodiment, the main body has a through hole. However, the main body may have a blind hole.

In the above-described embodiment, the hysteresis mechanism portion is provided. However, the hysteresis mechanism portion may not be provided. In this case, the "spring damper" disposed inside the pedal spring corresponding to a "coil spring" can prevent the collision between the spring wires of the pedal spring, when the pedal spring is compressed.

The present disclosure is not restricted to the embodiment mentioned, and can be implemented with various modification in the range not deviating from the scope of the present disclosure.

The invention claimed is:

1. An accelerator device comprising:
    a support portion to be attached to a vehicle body;
    an accelerator pedal to be depressed;
    a shaft coupled to the accelerator pedal and rotatably supported by a bearing of the support portion;
    a rotation angle detection unit that detects a rotation angle of the shaft with respect to the support portion and outputs a signal corresponding to the rotation angle of the shaft;
    an urging member that urges rotation of the shaft in an accelerator closing direction;
    a spring damper comprising:
        a coil spring comprising a spirally formed wire, the coil spring having an inner diameter, an outer diameter, a first end, and a second end;
        a first end turn part disposed adjacent to the first end of the coil spring, and a second end turn part disposed adjacent to the second end of the coil spring;
        a damper made of foam and inside the coil spring to decrease vibration of the coil spring, the damper contacting the first and second end turn parts, the damper comprising
            a main body between the first and second ends of the coil spring, the main body having a radially exterior surface portion that is inside of the inner diameter of the coil spring;
            a convex part protruding outward from the main body in a radial direction, the convex part having a distal end located on an outer side of a cylindrical virtual surface in the radial direction, the cylindrical virtual surface being midway between the inner diameter and the outer diameter, and the cylindrical virtual surface having a central axis coincident with a central axis of the coil spring; and
    wherein the damper is folded into two layers that extend in a same direction with a same length.

2. The accelerator device according to claim 1, wherein the convex part is between at least one of the first end turn part and the first end of the coil spring, and the second end turn part and the second end of the coil spring, along a direction of the central axis of the coil spring.

3. The accelerator device according to claim 1, wherein the convex part is spiral along the coil spring.

4. The accelerator device according to claim 1, wherein the convex part has a slope surface inclined from the distal end toward an outer wall of the main body along a direction of the central axis of the coil spring.

5. The accelerator device according to claim 1, wherein the main body and the convex part have a polygon shape in a cross-section perpendicular to the central axis of the coil spring.

6. The accelerator device according to claim 1, wherein the distal end of the convex part is on the outer side of the cylindrical virtual surface when no external force is applied to the coil spring.

7. The accelerator device according to claim 1, wherein the convex part is configured such that an amount of the convex part protruding from the main body is increased when the coil spring is compressed.

8. The accelerator device according to claim 1, wherein the distal end of the convex part is radially outward of the coil spring when the coil spring is compressed.

9. The accelerator device according to claim 1, wherein the two layers of the damper contact with each other interior to the inner diameter.

10. The accelerator device according to claim 1, wherein a space is between the coil spring and the damper in the radial direction.

11. The accelerator device according to claim 1, wherein the damper is folded at one axial end of the coil spring.

12. The accelerator device according to claim 10, wherein the space is one of a plurality of spaces between the coil spring and the damper, and
the plurality of spaces are symmetric with respect to the central axis.

13. The accelerator device according to claim 1, wherein a cross-section of the damper transverse to the central axis of the coil spring, when the damper is not compressed, has at least three straight sides.

* * * * *